United States Patent [19]

Potter

[11] 4,065,555

[45] Dec. 27, 1977

[54] INSECTICIDAL COMPOSITIONS EMPLOYING CERTAIN BLOCK COPOLYMERS

[75] Inventor: Richard C. Potter, Modesto, Calif.

[73] Assignee: Shell Oil Company, Houston, Tex.

[21] Appl. No.: 253,583

[22] Filed: May 15, 1972

Related U.S. Application Data

[63] Continuation-in-part of Ser. No. 94,586, Dec. 2, 1970, abandoned.

[51] Int. Cl.$^2$ ............................................. A01n 9/36
[52] U.S. Cl. ....................................... 424/83; 424/19; 424/219
[58] Field of Search ................... 424/80, 83, 19, 219, 424/33

[56] References Cited

U.S. PATENT DOCUMENTS

| 2,798,022 | 7/1957 | Yowell et al. | 424/83 |
| 3,265,765 | 8/1966 | Holden et al. | 260/876 |
| 3,318,769 | 5/1967 | Folckemer et al. | 424/219 |

Primary Examiner—Vincent D. Turner

[57] ABSTRACT

Slow release biocidal generators having a greater degree of flexibility with regard to generator size and release of biocide therefrom comprise a volatile liquid beta-halovinyl phosphate biocide dispersed in a blend of a block polymer and a plasticized vinyl chloride resin. The generators are insecticidally active.

10 Claims, No Drawings

INSECTICIDAL COMPOSITIONS EMPLOYING CERTAIN BLOCK COPOLYMERS

This application is a continuation-in-part of U.S. Ser. No. 94,586, filed Dec. 2, 1970 and now abandoned.

BACKGROUND OF THE INVENTION

The present invention is concerned with certain biocidal compositions. More particularly, it is directed to compositions of a volatile beta-halovinyl phosphate biocide dispersed in a blend of polymeric materials capable of being formed into various geometric configurations, said compositions having controlled release rates of the biocide therefrom. In addition, these compositions possess other physical properties beneficial in the production and processing of the biocidal compositions.

Certain halogenated vinyl phosphates are now well known as biocides particularly as invertebrate pesticides. These compositions are functional as general poisons on contact, by ingestion or by inhalation. Such biocides, for example, are disclosed in U.S. Pat No. 2,956,073. Because of their efficacy they are used as sprays, dusts, baits and in controlled release vapor generators such as disclosed and taught in U.S. Pat. No. 3,318,769. This patent discloses that volatile phosphate biocides may be dispersed in such materials as polyvinyl chloride resin and can be formulated together with certain plasticizers. These formulations have a limited degree of processability but may be formed into resin vapor generators which exhibit operable rates of diffusion when confined to certain geometric configurations.

In general, such vapor generators find utility in two fields, i.e., as fumigants and slow release generators. For fumigation purposes, the biocide is released rather rapidly over a short period of time in order to more or less saturate a confined space to completely kill or destroy the particular pest or pests within that space. For slow release application, the generator ideally releases only enough biocide into an enclosed environment to kill or control certain invertebrate pests in or coming into that environment and at a rate sufficiently low that it is non-toxic to other forms of life such as warm-blooded animals.

The overall rate of release of biocide from a given generator at any given time is dependent upon the temperature of the resin and surrounding environment, the concentration of biocide in the resin, the amount of free resin surface and the rate of migration of the biocide from the body of the resin to the surface, the latter being the rate controlling step. At a given temperature and generator size then, the rate of release is dependent upon the ability of the biocide to diffuse from within the generator to the surface. This rate of migration is controlled by a coefficient of proportionality called the diffusion coefficient. In general, the higher the diffusion coefficient is, the more flexible the resin becomes and the easier it is for the biocide to migrate or diffuse therefrom.

One of the disadvantages of the slow release formulations as taught in the prior art is that the coefficient of diffusion is limited in range. This limitation is a result of various factors. The diffusion coefficient of these formulations can be increased by methods such as increasing the amount of plasticizer or biocide in the generator matrix. For sufficiently higher concentrations, this however results in incompatibility between the resin and the biocide or plasticizer and causes bleeding of biocide or plasticizer from the matrix as well as increased water pick-up on the surface of the generator. Moreover, prior art compositions are restricted to certain geometrical configurations because of processing limitations.

The thicker the profile of the generator, the more severe become the processing limitations due to thermal degradation and decomposition at the processing temperatures. As a result, in order to attain the sustained rate of release of biocide from the generator which is required over an extended period of time to control pests, certain restricted geometric configurations must be maintained. The most common geometric configuration has been in the form of a strip of plasticized PVC containing certain amounts of a beta-halovinyl phosphate biocide such as dimethyl 2,2-dichlorovinyl phosphate (DDVP). This strip is rectangular in shape and due to the low diffusion coefficient has to have a relatively large surface area and thin cross section to permit the proper rate of diffusion of an effective amount of the biocide into the surrounding environment or atmosphere. The pesticide emission patterns for such formulations follow essentially an exponential curve with the relatively high emission rate at the outset falling to a relatively constant lower rate. Flexibility in the rates of release from these generators is not possible to obtain because of the limitations imposed by the required fixed geometry as well as the diffusion coefficient.

The initial release of biocide from the prior art PVC resin generators is adequate; however, the diffusion coefficient is sufficiently low that the diffusion of biocide from the generator falls to an unacceptably low point long before the biocide is depleted from the resin matrix. On the other hand, when the prior art PVC generators are utilized for the gradual slow release of pesticide into the surrounding atmosphere such as in rooms or in other environments, there is an initial high rate of release of pesticide into the atmosphere. While such formulations permit the pesticides to be used effectively yet safely, the rate of release is such as results in a waste of pesticide. The high initial rate is unnecessary to the control of insects and the vaporous pesticide can be lost physically from a space to be treated and also lost chemically by decomposition caused by moisture. Therefore, at the onset and for some time thereafter, the PVC formulation emits considerably more of the pesticide than is necessary. Not only does this subject the pesticide to unnecessary loss, but materially reduces the effective life of the formulation. Because of processing limitations, it is difficult, and in some cases impossible, to fabricate a PVC generator having a substantially thicker profile to lower the initial release rate and even if it were feasible, because of the low diffusion coefficient, the biocide would be released from the generator at an unacceptably low rate in a relatively short period of time.

It is, therefore, an object of the present invention to provide novel stable pesticidal and biocidal compositions characterized by a controlled sustained release of the volatile pesticide or biocide therefrom. A further object of the invention is the provision of resin compositions of dialkyl beta halogenated vinyl phosphate biocides exhibiting substantially increased diffusion coefficients of the biocide. A further object of the invention is the provision of such compositions which enable the enchanced processability and capability of being formed into useful biocidal objects. Another object is the provision of a composition which due to its improved diffusion coefficient of biocide can be formed into various geometric forms thereby allowing improved control of the release rate of the biocide into the surrounding atmosphere. Other objects will become apparent during the following detailed description of the invention.

Now, in accordance with the present invention, biocidal compositions are provided comprising a normally volatile liquid beta-halovinyl phosphate dispersed in a combination of polymers, one of which is a plasticized vinyl chloride resin and the other of which is one or more of a group of block copolymers as more fully defined hereinafter. Still, in accordance with this invention, it has been found that the presence of the block copolymer substantially increases the diffusion coefficient of the biocide from the plasticized vinyl chloride block copolymer matrix as compared with similar compositions in which the block copolymer has been omitted. Again, in accordance with this invention, the presence of the block copolymer substantially and unexpectedly improves the processability of the subject compositions.

The biocidal materials with which this invention is primarily concerned can be generally described as normally liquid halogenated vinyl phosphate biocides which are relatively volatile at ambient temperatures. Preferred relatively volatile phosphates have the following structures:

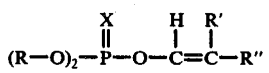

wherein R represents alkyl of from 1 to 2 carbon atoms, X is O or S, R' is hydrogen or halogen and R'' is halogen, which may be chlorine, fluorine, or bromine and preferably chlorine.

Typical species of these compounds include:

Dimethyl 2,2-dichlorovinyl phosphate;
Dimethyl 2,2-dichlorovinyl phosphorothionate;
Diethyl 2-chlorovinyl phosphate;
Dimethyl 2-chlorovinyl phosphate;
Diethyl 2,2-dichlorovinyl phosphate;
Diethyl 2,2-dichlorovinyl phosphorothionate;
Dimethyl 2,2-dibromovinyl phosphate;
Dimethyl 2-bromovinylphosphate;
Diethyl 2,2-dibromovinyl phosphate;
Diethyl 2-bromovinyl phosphate;
Dimethyl 2,2-difluorovinyl phosphate;
Diethyl 2-fluorovinyl phosphate;
Dimethyl 2-chloro-2-fluorovinyl phosphate;
Dimethyl 2-chloro-2-fluorovinylphosphorothionate.

Preferred are those compounds wherein X is O, R' is H or chlorine and R'' is chlorine.

Since the above compounds are capable of existing as optical isomers this invention includes such separate isomers or racemic mixtures of isomers.

The vinyl chloride resins comprising one of the several classes of polymers in which the biocides described above are to be dispersed in accordance with this invention may be either homopolymeric polyvinyl chloride or its copolymers. These include vinyl chloride-vinyl acetate copolymers, vinyl chloride-vinylidene chloride polymers, vinyl chloride-furmarate copolymers, vinyl chloride-maleate copolymers, vinyl chloride-acrylic ester copolymers, vinyl chloride-acrylonitrile copolymers, vinyl chloride-alkylvinyl ether copolymers and vinyl chloride-olefin copolymers.

The vinyl chloride resins may be plasticized with from 5 to 40%w. basis total composition of either a suitable pesticidally inert ester or one of the biocides mentioned above. While the vinyl phosphate biocides alone function as a plasticizer for PVC, it is generally desirable, but not necessary, for the resin to also contain a pesticidally inert plasticizer. Suitable pesticidally inert esters which may be used as plasticizers include the triaryl phosphates, such as tricresyl phosphate, triphenyl phosphate, tri(p-tert-butylphenyl) phosphate, tri(biphenylyl) phosphate, o-biphenylyl diphenyl phosphate, and cresyl diphenyl phosphate; the trialkyl phosphates, such as tri-n-butyl phosphate, tri-2-ethyl-hexyl phosphate, tri-n-octyl phosphate and tri-lauryl phosphate; and such mixed phosphates as 2-ethylhexyl diphenyl phosphate and the like. These compounds may be generally described by the structure 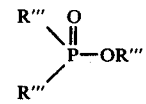 where R''' is a hydrocarbon radical selected from the group consisting of alkyl, aryl, aralkyl and alkaryl preferably having at least four carbon atoms. These esters are virtually non-volatile but impart excellent plasticized properties to the resulting composition. Because of their similar composition, they are readily compatible with the pesticides in the resin compositions.

Other suitable materials, which are effective for plasticizing the resin and are comparatively non-volatile and pesticidally inert, include phthalate esters, such as dioctyl phthalate, diphenyl phthalate, dicyclohexyl phthalate, dimethyl phthalate and the dihexyl phthalates; the sebacates, such as dipentyl sebacate, n-butyl benzyl sebacate and dibenzyl sebacate; and the adipates, such as dioctyl adipate, dicapryl adipate, diisobutyl adipate, and dinonyl adipate. Other compatible plasticizers, such as the hydrocarbon resinous plasticizers exemplified by hydrogenated polyphenyls and alkylated aromatic hydrocarbon, and polyester plasticizers, e.g., polyesters of such polyols as hexanediol and such polycarboxylic acids as sebacic and adipic acid having molecular weights of about 2000, may also be used.

The block copolymers may be either linear or branched in their configurations. While molecular weight does not form an essential aspect of the present invention, the usual molecular weight range is between about 20,000 and 500,000, normally between about 30,000 and 150,000.

The block copolymers especially useful in the present compositions are block copolymers of conjugated dienes with mono-alpha-alkenyl arenes as well as the hydrogenated derivatives thereof including block copolymers in which alpha monoolefin polymer blocks may be used in place of or in addition to hydrogenated diene blocks. Normally these will have at least one block A comprising a mono-alpha-alkenyl arene polymer block or its hydrogenated drivative and at least one block B comprising a conjugated diene polymer block hydrogenated derivative or the poly (alpha-monoolefin) equivalent of the latter. Where, in the specification and claims, reference is made to hydrogenated conjugated diene polymer blocks, this will be understood to include equivalent poly(alpha-monoolefin) blocks as well.

Preferably, the block copolymers have the general configuration selected from the group A-B(A)$_m$, A-B-

(B-A)$_n$ or A-(B-A)$_n$ wherein each A and B is as defined above, m is 0 or 1 and n is an integer from 2 to 5 (preferably 2 or 3). Wherever adjacent polymer blocks are substantially identical, e.g., B-B, they are to be regarded as a single polymer block. The block copolymers may be either linear or branched in their configuration and are made by processes already known in the art of polymerization such as by solution polymerization involving lithium initiators. The proportion of A or B blocks in the block copolymer does not constitute as essential aspect of the present invention; however, where high impact or elastomeric properties are to be imparted to the composition, it is preferred that the block copolymer contain at least 50 wt. percent of elastomeric copolymer (B) blocks. However, block copolymers having more than 50% of the thermoplastic block, i.e., A blocks, are operable in the present compositions for the purpose of improving the processability of the compositions and their compatibility.

The monomers from which the blocks A may be formed are typified by styrene or alkylated styrene, especially alpha-methyl styrene. The conjugated dienes are represented by butadiene and isoprene as well as their homologs giving up to about 8 carbon atoms per molecule. While the individual block polymer weights are not an essential aspect of the present invention, blocks A will normally have average molecular weights in the order of 5,000 to 100,000, preferably 10,000 to 50,000. The blocks B will usually have average molecular weights in the order of 15,000 to 500,000, usually 35,000 to 150,000. The following species are typical of the block copolymers contemplated, it being stressed that for the sake of simplicity in the following list, only block copolymers having three blocks are specified.

Poly(alpha-methyl styrene)-polyisoprene-poly(alpha-methyl styrene);

Polysytrene-polyisoprene-polystyrene;

Polystyrene-polybutadiene-polystyrene.

In addition to these block copolymers as listed above, partially, i.e., selectively, randomly or completely hydrogenated derivatives thereof may be employed in addition to or in place of a non-hydrogenated species. Preferably, if the polymer is selectively hydrogenated any conjugated diene polymer blocks are hydrogenated while monoalpha-alkenyl arene polymer blocks are essentially unaltered, or at least no more than 25% hydrogenated. The following species typify selectively hydrogenated block copolymers:

Poly(alpha-methyl styrene) - (hydrogenated polyisoprene)-poly (alpha-methyl styrene);

Polystyrene-(hydrogenated polybutadiene)-polystyrene;

Polystyrene-(hydrogenated polyisoprene)-polystyrene.

If the mono-alpha-alkenyl arene polymer blocks are hydrogenated as well as the conjugated diene polymer blocks, the products obtained are typified by the following:

Polyvinyl cyclohexane-(hydrogenated polyisoprene)-polyvinyl cyclohexane;

Polyvinyl cyclohexane-(hydrogenated polybutadiene)-polyvinyl cyclohexane.

Substantially equivalent block copolymers may be prepared or supplied in which hydrogenation steps may be avoided by block polymerizing a mono-alpha-alkenyl arene with one or more alpha monoolefins, for example, hydrogenated polyisoprene blocks are regarded as being substantially equivalent to ethylene-propylene copolymer blocks wherein the ratio of ethylene and propylene are essentially 1:1.

Furthermore, suitable block copolymers may be employed wherein the order to blocks A and B are reversed from that given in the general formula set hereinabove so that the blocks A are "interior" blocks and the blocks B either hydrogenated or non-hydrogenated are end blocks. The generic formulae for such alternatives are as follows:

B-A-(B)$_m$, B-A-(A-B)$_n$ and B-(A-B)$_n$ wherein m and n are previously described.

The compositions particularly contemplated may preferably have the following proportions of the essential components:

| | |
|---|---|
| Biocide | 5–50% wt. |
| Inert Plasticizer | 0–40% wt. |
| Polyvinyl chloride resin | 20–75% wt. |
| Block copolymer | 1–30% wt. |

In addition to the essential components, other additional materials may be utilized such as supplementary plasticizers, oil, or other extenders, pigments and supplementary resins. Stabilizers for any one of the components may also be employed. Odorants and colorants may be present as well.

It has been found that the plasticizers, particularly the esters of dicarboxylic acids, are especially useful in increasing the diffusion coefficients of the biocide in the compositions when they are present in amounts ranging from about 5–40% by weight of the total composition. It has been noted that the biocides used in this invention also act as plasticizers. However, the term "plasticized polyvinyl chloride" resin as used herein has reference to a polyvinyl chloride resin which has been plasticized with a conventional plasticizer such as the dicarboxylic acid esters.

The presence of the block copolymer in the compositions of the present invention imparts substantial advantages heretofore not attainable. For example, the increase in the diffusion coefficient is thought to be due primarily to the block B polymers of the block copolymer, although the invention is not predicated on this theory. The elastomeric blocks reduce the stiffness of the plastic matrix, thereby making it more flexible and more susceptible to enhanced diffusion and increase of diffusion coefficient.

Another important advantage caused by the presence of block copolymers in thermoplastic biocidal compositions lies in the fact that the compositions containing the block copolymers are stable and dry, i.e., they are free from the exudation, dripping or bleeding of biocide and its decomposition products from the surface which is sometimes observed in prior art compositions. They are also less susceptible to water accumulation and/or interaction with biocide at the generator surface.

The presence of a block copolymer in compositions of the present invention substantially increases the diffusion coefficient of the biocide from the compositions and also imparts a number of functional advantages going especially to the processing of the compositions. The block copolymer surprisingly enough acts as a flow promoter for the mixture of biocide and plasticized polyvinyl chloride risin. This flow promotion effect is believed to be brought about by the affinity the plasticizer and/or biocide has for the polyarene or block A portion of the block copolymer. In processing, intimate contact between the plasticizer and/or biocide and block A polymer results in a loosening of the entire block copolymer network. Although the block copolymer is but a minor portion of the whole composition, this loosening effect for some reason, not fully understood, permits the whole composition to flow more easily than it would in the absence of block copolymer. This loosening effect results in a decrease in viscosity of the molten composition. One skilled in the art would know how to use this decrease in viscosity to improve the throughput and reduce the processing temperature of the molten mass through an extruder or the like. As a result of the present invention, the throughput in processing equipment is considerably enhanced, thus providing greater plant capacity without plant enlargement. The material readily fills any extruder die shape and emerges with a smooth surface and uniform cross section and minimal die swell.

A further consequence of the presence of the block copolymer is the reduction in temperature required to produce flow of the plastic mass. Due to the lower temperature requirements for flow and high die profile conformity, it is possible to extrude profiles at a lower extruder die temperature having thicknesses which would be impossible to extrude if the block copolymer were absent. If the block copolymer were absent, higher die temperatures would have to be employed in order to achieve flow. This would increase the cooling time of the material even in a water bath to the point where excessive decomposition of the biocide, which is somewhat thermally reactive, would occur. Moreover, the block copolymer modified material suprisingly cools faster than the unmodified mass thereby lessening the chance for thermal biocide decomposition. An additional advantage associated with the lower temperature requirements is the increase in the quenching rate of the plastic mass coming through the extruder. Because the quenching rates are increased, a reduction in size of cooling equipment is possible.

Perhaps the most surprising aspect of this invention is that the block copolymer and polyvinyl chloride resins should be technologically compatible, i.e., that mixtures may be fabricated by extrusion, etc., to produce articles with good mechanical strength. It is unexpected that mixtures of vinyl resins and block copolymers are sufficiently compatible to be readily processable and capable of being formed into useful articles. The inert plasticizer and/or biocide operates in some way to bring the polyvinyl chloride resin and block copolymer together in a stable mixture. Such technological compatibility is unexpected and could not be predicted from the prior art.

The preparation of the compositions of the invention is achieved by the conventional methods. Because of the unexpected technological compatibility of the three basic components, namely, the biocide, polyvinyl chloride resin and block copolymer, the compositions may be prepared merely by mchanical mixing of the biocide with the resin and copolymer. This mixture may be further processed, for example, plastisols may be made which can be molded, extruded, cast, or otherwise formed into such shapes as rods, sheets, granules, blocks, foams and the like. Alternatively, the biocide may be incoporated in the resin and block copolymer by milling, by the use of mutual solvents, or by similar blending techniques.

The resulting compositions contain the biocide admixed with the polymers and plasticizer in substantially unchanged form.

A major advantage of the compositions of this invention lies in the substantially enhanced diffusion coefficient resulting in the controlled release of a volatile biocide from the composition into the atmosphere surrounding the product.

One of the most notable advantages of the present invention lies in its ability to be made into various geometrical configurations or shapes and still be able to provide the required degree of diffusion of the biocide into the surrounding atmosphere. Because of the enhanced diffusion coefficient it is now possible to formulate a vapor generator having a small surface area and about the same initial mass which initially discharges less biocide per unit of time than do the vapor generators not containing block copolymers. These compact generators are useful over the same period or even a longer period of time than prior art compositions not containing block copolymers and having a larger surface area. In other words, if the release rate of the compositions of the present invention having the desired geometry were to be plotted graphically as rate of release versus time, a flatter curve would be obtained from the compositions of the present invention as compared to the larger surface prior art compositions not containing the block copolymer. The compositions of the present invention can now be produced in geometric forms that are more compact than is practically possible with the biocide polyvinyl chloride products not containing the block copolymer.

The compositions are highly effective for the killing of invertebrate pests including various microorganisms, nematodes, ticks, spiders, mites and insects by subjecting them to the compositions of the invention. For example, the compositions can be made into pet collars which when placed around the neck of an animal such as a dog or cat will result in a sustained release of biocide over a period of time, thereby controlling normal ectoparasites usually found on such animals such as fleas. Moreover, the compositions of the present invention can be utilized as granules or pellets and placed in soil wherein the slow sustained release of pesticide from the compositions results in the control of various soil pests such as nematodes, cut worms, root worms, etc. The compositions of the present invention may also be used for fumigation purposes as previously stated by being placed in warehouses, grain bins, etc. The major use anticipated for the compositions of the present invention, however, is placing the desired geometrical form in a closed space such as a room whereby the sustained release of pesticide into the atmosphere results in the control of any pests present in the room, i.e., pests such as houseflies and mosquitoes.

The following examples are illustrative of the compositions and other features of the present invention. With the exception of Blends 9, 10 and 25, (Examples 4 and 12), the biocide utilized and referred to was "DDVP" i.e. dimethyl dichlorovinyl phosphate. The block copolymers used in the examples were either formulated or used as undiluted polymers as indicated in the following table:

| Block Copolymer Compound | Block Polymer* | Mol. Wt. ×10⁻³ | % Block Polymer | % Oil | % Polystyrene | % Filler |
|---|---|---|---|---|---|---|
| 1 | SIS | 10-125-10 | 100 | — | — | — |
| 2 | SBS | 14-57-14 | 46 | 32 | 15 | 7 |
| 3 | SBS | 14-57-14 | 65 | 35 | — | — |
| 4 | SBS | 9.5-51.5-9.5 | 100 | — | — | — |
| 5 | SBS | 14-65-14 | 100 | — | — | — |
| 6 | SBS | 22-48-22 | 65 | 35 | — | — |
| 7 | SBS | 20-103-20 | 83 | 17 | — | — |
| 8 | SBS | 14-57-14 | 69 | 31 | — | — |

*S=polystyrene
I=polyisoprene
B=polybutadiene

The vinyl chloride resins used in the examples were homopolymers of vinyl chloride and each had an Inherent Viscosity of 1.1 as determined by ASTM test D 1243-60 Method A. These resins are referred to hereinafter as Polyvinyl Chloride No. 1 and Polyvinyl Chloride No. 2.

EXAMPLE I

The viscosity reduction or flow promotion effects are illustrated by this and subsequent examples.

Into a Brabender Plasti-Corder Torque Rheometer, Model PL-V300 equipped with an electrically heated measuring head with head with roller blades was placed a 40 gram dry blend sample of the composition to be tested. The roller blades were operated at a speed of 90 RPM. The maximum torque was reached when all of the dry blend ingredients had fused into a homogeneous molten plastic mass. This was called the fusion point. The lower the torque at the fusion point the easier the composition is to process.

| Blend No. | 1 | 2 |
|---|---|---|
| Composition (%w) | | |
| DDVP | 40 | 40 |
| Block Copolymer No. 1 | 5 | 0 |
| Polyvinyl chloride No. 2 | 52 | 57 |
| PVC Stabilizers | 3 | 3 |
| Temperature (° F) | 310 | 310 |
| Torque (meter-gram) | 530 | 780 |

The torque developed in Blend 2, which did not contain the block copolymer, was 47% higher than that in the block polymer modified Blend 1.

EXAMPLE 2

The procedure of Example 1 was used with the following results.

| Blend No. | 3 | 4 |
|---|---|---|
| Composition (%w) | | |
| DDVP | 23 | 23 |
| Dioctyl phthalate | 19 | 19 |
| Polyvinyl chloride No. 1 | 45 | 55 |
| PVC Stabilizer | 3 | 3 |
| Block Copolymer No. 2 | 10 | — |
| Temperature (° F) | 300 | 300 |
| Torque (meter-gram) | 490 | 950 |
| Time to Fusion (min.) | 2 | 5 |

The torque developed in Blend 2, without the block copolymer, was 95% higher than the block copolymer Blend 3. Also, it took more than twice as long to reach a homogeneous molten state with Blend 4 than with Blend 3.

EXAMPLE 3

The procedure of Example 1 was again followed with the compositions indicated:

| Blend No. | 5 | 6 | 7 | 8 |
|---|---|---|---|---|
| Composition (%w) | | | | |
| DDVP | 35 | 35 | 35 | 35 |
| Polyvinyl chloride No. 1 | 57 | 57 | 57 | 62 |
| PVC Stabilizer | 3 | 3 | 3 | 3 |
| Block Copolymer No. 3 | 5 | — | — | — |
| Block Copolymer No. 4 | — | 5 | — | — |
| Block Copolymer No. 1 | — | — | 5 | — |
| Temperature (° F) | 340 | 340 | 340 | 340 |
| Torque (meter-gram) | 530 | 620 | 580 | ¹ |

¹ No reading - homogeneous molten state not reached at 340° F.

This example shows that compositions of the present invention are processable at lower temperatures than corresponding compositions (Blend 8) not containing the block copolymer.

EXAMPLE 4

This example shows the enhancement in diffusion coefficient caused by incorporating the block copolymers into biocidal thermoplastic formulations.

| Blend No. | 9 | 10 |
|---|---|---|
| Composition (%w) | | |
| Diethyl-2-chlorovinyl phosphate | 30 | 30 |
| Polyvinyl chloride No. 1 | 57 | 67 |
| PVC Stabilizer | 3 | 3 |
| Block Copolymer No. 2 | 10 | — |
| Diffusion Coefficient (in ²/day) | $1.5 \times 10^{-5}$ | $5 \times 10^{-7}$ |

The compositions were heated and blended into a homogeneous molten mass and extruded as cylindrical strands approximately 6 inches long and ¼ inch in diameter. Diffusion coefficients were calculated from ambient weight loss data (70°-74° F, 30-50% Relative Humidity, fresh air ventilation) over a 110 day period. At the end of 110 days, Blend No. 9 had lost 0.63 grams while Blend 10 had lost only 0.15 grams.

EXAMPLE 5

The enhancement in formulation stability is also illustrated by this example.

| Blend No. | 11 | 12 |
|---|---|---|
| Composition (%w) | | |
| DDVP | 26 | 27 |
| Polyvinyl chloride No. 1 | 41 | 50 |
| PVC Stabilizer | 3 | 3 |
| Dioctyl Adipate | 20 | 20 |
| Block Copolymer No. 5 | 10 | — |

The compositions were heated and blended into a homogeneous mass. Blend No. 11 was extruded into a 10 × 2.5 × 0.21 inch strip and Blend No. 12 was injection molded into a 6½ × 2½ × 0.3 inch strip. The strip from Blend No. 12 was wet after three weeks with droplets of liquid on the surface.

EXAMPLE 6

This example again shows the improved diffusion coefficients and formulation stability obtained from the compositions of this invention.

|  | Blend No. | | | |
|---|---|---|---|---|
|  | 13 | 14 | 15 | 16 |
| Composition (%w) | | | | |
| DDVP | 23 | 23 | 23 | 23 |
| Polyvinyl chloride No. 1 | 46 | 45 | 45 | 55 |
| PVC Stabilizer | 2 | 3 | 3 | 3 |
| Dioctyl adipate | 19 | 19 | 19 | 19 |
| Block Copolymer No. 6 | 10 | — | — | — |
| Block Copolymer No. 2 | — | 10 | — | — |
| Block Copolymer No. 7 | — | — | 10 | — |
| Diffusion coefficient (in $^2$/day) | $1.2 \times 10^{-4}$ | $1.5 \times 10^{-4}$ | $1.1 \times 10^{-4}$ | $6.5 \times 10^{-5}$ |

Homogeneous molten mixtures having the above compositions were extruded or injection molded into various geometric shapes: extruded 4 × 4 × 0.5 inch strips for Blend 13; extruded 10.1 × 2.8 × 0.24 inch strips for Blend 14; and injection molded 6.4 × 2.5 × 0.3 inch strips for Blend 15. Blend 16 was extruded into a 10 × 2.5 × 0.22 inch strip and also injection molded into a 6.4 × 2.5 × 0.3 inch strip. Diffusion coefficients were calculated from weight loss data over a 120-day period. The strip from Blend 16 was wet on the surface within 30 days with droplets of liquid on the surface.

EXAMPLE 7

The improvement in throughput and processibility resulting from the use of block copolymers in pesticidal thermoplastic compositions are illustrated by this example.

The compositions were heated to a homogeneous molten state and processed through a 3/4-inch Brabender extruder into strands having 1/8 inch diameter. The compositions and results are as follows.

|  | Blend No. | |
|---|---|---|
|  | 17 | 18 |
| Composition (%w) | | |
| DDVP | 23 | 23 |
| Polyvinyl chloride No. 1 | 45 | 55 |
| PVC Stabilizer | 3 | 3 |
| Dioctyl Adipate | 19 | 19 |
| Block Copolymer No. 2 | 10 | — |
| Temperature ° F (extruder) | | |
| Rear Zone | 340 | 340 |
| Zone 2 | 330 | 330 |
| Zone 3 | 260 | 260 |
| Die | 240 | 240 |
| Die Pressure (psi) | 350 | 800 |
| RPM (Extruder) | 90 | 90 |
| Throughput (grams/minute) | 48.5 | 34.5 |

As is evident from the above, the throughput rate of material through the extruder is significantly increased and exerts a lower die pressure by the incorporation of an appropriate block copolymer in the composition.

EXAMPLE 8

The procedure of Example 7 was followed with the following results.

|  | Blend No. | |
|---|---|---|
|  | 19 | 20 |
| Composition (%w) | | |
| DDVP | 42 | 42 |
| Polyvinyl chloride No. 2 | 45 | 55 |
| PVC Stabilizer | 3 | 3 |
| Block Copolymer No. 5 | 10 | — |
| Temperature ° F (Extruder) | | |
| Rear Zone | 280 | 280 |
| Zone 2 | 310 | 310 |
| Zone 3 | 290 | 290 |
| Die | 240 | 240 |
| Die Pressure (psi) | 850 | 1000 |

-continued

|  | Blend No. | |
|---|---|---|
|  | 19 | 20 |
| RPM (Extruder) | 90 | 90 |
| Throughput (grams/minute) | 75.0 | 60.0 |

EXAMPLE 9

Improved throughput and the ability to be extruded into geometric configurations of varying thickness are illustrated by this example.

Block copolymer modified compositions were compared with similar unmodified compositions by heating them to the point of fusion and passing the homogeneous molten mass through various extruder dies. The compositions used were:

|  | Blend No. | |
|---|---|---|
|  | 21 | 22 |
| Composition (%w) | | |
| DDVP | 23 | 23 |
| Polyvinyl chloride No. 1 | 45 | 55 |
| Dioctyl adipate | 19 | 19 |
| PVC Stabilizer | 3 | 3 |
| Block Copolymer No. 2 | 10 | — |

The extruder was operated under the following conditions: Temperatures: Rear Zone 300°, Zone 2, 315°, Zone 3 320° F; Extruder screw speed: 90 RPM. The results are as follows:

| Blend No. | Throughput (lbs/hr)[1] | Die Gap (in) | Die Temp., ° F |
|---|---|---|---|
| 21 | 107 | 0.25 | 300 |
| 22 | 66 | 0.25 | 300 |
| 21 | 108 | 0.25 | 250 |
| 22 | 65 | 0.25 | 250[2] |
| 21 | 106 | 0.50 | 250 |
| 22 | 64 | 0.50 | 250[3] |

[1]Average value of duplicates
[2]poor fusion
[3]poor fusion and severe product degradation When using a die gap of 0.50 inches, Blend 22 exhibited considerable die swell and the extruded strip measured 1 inch in thickness, compared to ½-inch for the block copolymer modified Blend 21. Furthermore, Blend 22 did not fill the die well and was only 5-½ inches in width, whereas Blend 21 filled the die to its complete width, i.e. 6 inches.

It is evident from the above that the unmodified compositions possess severe processing limitations, i.e. the unmodified composition (Blend 22) was successfully processed only at 300° F and at a die gap of 0.25 inches. These limitations seriously limit the geometry of the unmodified compositions.

EXAMPLE 10

The importance of being able to vary the geometry of pesticide generators is shown by this example. The formulations used were those described in Example 9, i.e. Blends 21 and 22. In Example 9 it was demonstrated that Blend 22 could not be successfully extruded at a die profile of 0.5 inch. Strips were extruded having the following properties.

| Blend No. | 21 | 22 |
|---|---|---|
| Size | 4" × 2.5" × 0.5" | 10" × 2.5" 0.23" |
| Weight | 98 grams | 115 grams |
| Avg. DDVP Vaporization rate over the first 24 hours | 30 mg/hour | 40 mg/hour |
| Vaporization rate | 2 mg/hr at 120 days | 2 mg/hr at 90 days |
| % depletion | 70% at 120 days | 70% at 90 days |
| Weight DDVP Initially | 20.5 grams | 26.4 grams |
| Weight DDVP Used | 14.4 grams | 18.45 grams |
| Surface area generator (in$^2$) | 26.5 | 55.8 |

A vaporization rate of 2 mg/hr of biocide has been shown to be effective to control pests under most use conditions and for purposes of this example was considered to be the minimum. Blend 21 initially released the DDVP at a considerably lower rate than Blend 22. Because of the geometry Blend 21 was effective over a 120 day period and only used 14.4 grams of DDVP as compared to Blend 22 which released 18.5 grams of DDVP over a 90 day period. Blend 22 had over twice the surface area of Blend 21. It is evident that the block copolymer modified blend was effective over a longer period of time and used less biocide in so doing. The advantages of being able to effectively alter the geometry of the vaporizer are therefore obvious.

EXAMPLE 11

Generators made from Blends 21 and 22 having dimensions of 10 × 2.5 × 0.23 and having diffusion coefficients of $1.5 \times 10^{-4}$ in $^2$/day and $6.5 \times 10^{-5}$ in $^2$/day respectively were placed in a 6 × 6 × 6 foot Peet Grady Chamber. Each test was run three times with one generator per chamber. Houseflies were introduced into the chambers at the same time as the generator and the average results are as follows.

| | % Knockdown | | | | Knockdown Time (Minutes) | |
|---|---|---|---|---|---|---|
| | 15 min. | 30 min. | 45 min. | 60 min. | 50% Knockdown | 90% Knockdown |
| Blend 21 | 36 | 92 | 98 | 100 | 17 | 29 |
| Blend 22 | 20 | 64 | 95 | 99 | 26 | 38 |

For fumigation purposes within a limited space, it is obvious that Blend 21 (block-copolymer modified) is superior to Blend 22 (unmodified).

EXAMPLE 12

The following compositions are also typical of compositions which can be prepared within the scope of this invention. These compositions were all heated to the point of fusion and extruded as a ⅛ inch diameter strand.

| | Blend No. | | |
|---|---|---|---|
| | 23 | 24 | 25 |
| Composition (%w) | | | |
| DDVP | 5 | 30 | — |
| O-(2,2-dichlorovinyl) 0,0-dimethyl phosphorothioate | — | — | 10 |
| Polyvinyl chloride No. 1 | 47 | 52 | — |
| Polyvinyl chloride No. 2 | — | — | 47 |
| PVC Stabilizers | 3 | 3 | 3 |
| Tricresyl phosphate | 30 | — | — |
| Dioctyl phthalate | — | 10 | — |
| Dibutyl phthalate | — | — | 35 |
| Block Copolymer No. 8 | 15 | — | — |
| Block Copolymer No. 3 | — | 5 | — |
| Block Copolymer No. 1 | — | — | 5 |

EXAMPLE 13

The following blends were injection molded to form biocidal generators having a dimension of 6.4 × 2.5 × 0.3 inches and were then tested for weight loss.

| | Blend No. | |
|---|---|---|
| | 26 | 27 |
| Composition (%w) | | |
| DDVP | 31.5 | 27.0 |
| Polyvinyl chloride No. 1 | 27.6 | 42.7 |
| PVC Stabilizer | 1.5 | 2.2 |
| Dioctyl phthalate | 9.4 | — |
| Dioctyl adipate | — | 14.6 |
| Block Copolymer No. 5 | 30.0 | 13.5 |
| Cumulative Weight Loss (grams) | | |
| 1 day | 1.21 | 1.34 |
| 2 days | 1.60 | 1.79 |
| 7 days | 4.59 | 4.58 |
| 14 days | 7.27 | 9.34 |
| 21 days | 9.13 | 12.27 |
| 36 days | 12.00 | 16.31 |
| 43 days | 13.00 | 17.74 |

The upper range in copolymer concentration is illustrated by this example.

I claim as my invention:

1. An insecticidal composition comprising
   a. 5-50% by weight of a volatile insecticidal compound of the formula

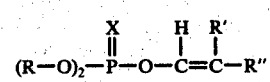

wherein R is alkyl of 1 or 2 carbon atoms, X is O or S, R' is hydrogen or halogen and R" is halogen;
   b. 20-75% by weight of a polyvinyl chloride resin;
   c. 0-40% by weight of an insecticidally inert polyvinyl chloride resin plasticizer; and
   d. 1-30% by weight of a block copolymer of the formula

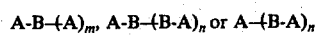

wherein A is a polymer block of styrene or alpha-methyl styrene having a molecular weight of about 5,000 to 100,000, B is a polymer block of butadiene or isoprene having a molecular weight of about 15,000 to 500,000, m is 0 or 1 and n is an integer from 2 to 5 or the hydrogenated derivatives thereof.

2. An insecticidal composition comprising
   a. 5-50% by weight of a volatile insecticidal compound of the formula

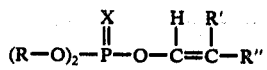

wherein R is alkyl of 1 or 2 carbon atoms, X is P or S, R' is hydrogen or halogen and R" is halogen;
b. 20–75% by weight of a polyvinyl chloride resin;
c. 0–40% by weight of an insecticidally inert polyvinyl chloride resin plasticizer; and
d. 1–30% by weight of a block copolymer of the formula

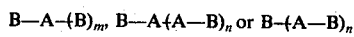

wherein A is a polymer block of styrene or alpha-methyl styrene having a molecular weight of about 5,000 to 100,000, B is a polymer block of butadiene or isoprene having a molecular weight of about 15,000 to 500,000, $m$ is 0 or 1 and $n$ is an integer from 2 to 5 or the hydrogenated derivatives thereof.

3. The insecticidal of claim 1 wherein in (a) X is O, R' is hydrogen or chlorine and R" is chlorine.

4. The insecticidal composition of claim 3 wherein in (a) R is methyl and R' is chlrine.

5. The insecticidal composition of claim 4 wherein in (d) the block copolymer has the formula $A-B-A)_m$ wherein A is a polymer block of styrene, B is a polymer block of butadiene and $m$ is 1.

6. The insecticidal of claim 3 wherein in (a) R is ethyl and R' is hydrogen.

7. A method of controlling insects which comprises subjecting said insects insecticidally effective amount of the composition of claim 1.

8. A method of controlling insects which comprises subjecting said insects to an insecticidally effective amount of the composition of claim 3.

9. A method of controolling insects which comprises subjecting said insects an insecticidally effective amount of the composition of claim 4.

10. A method of controlling insects which comprises subjecting said insects to an insecticidally effective amount of the composition of claim 6.

* * * * *